United States Patent
Simpson

(10) Patent No.: US 10,322,544 B1
(45) Date of Patent: Jun. 18, 2019

(54) LIQUID RESIN MODIFICATION FOR VOLUMETRIC SUPERHYDROPHOBIC 3D PRINTING

(71) Applicant: John T. Simpson, Sahuarita, AZ (US)

(72) Inventor: John T. Simpson, Sahuarita, AZ (US)

(73) Assignee: John T. Simpson, Sahuarita, AZ (US)

( * ) Notice: Subject to any disclaimer, the term of this patent is extended or adjusted under 35 U.S.C. 154(b) by 0 days.

(21) Appl. No.: 16/029,874

(22) Filed: Jul. 9, 2018

(51) Int. Cl.
| | |
|---|---|
| *B29C 64/165* | (2017.01) |
| *B33Y 10/00* | (2015.01) |
| *B33Y 70/00* | (2015.01) |
| *B33Y 80/00* | (2015.01) |
| *B29K 509/08* | (2006.01) |

(52) U.S. Cl.
CPC ............ *B29C 64/165* (2017.08); *B33Y 10/00* (2014.12); *B33Y 70/00* (2014.12); *B29K 2509/08* (2013.01); *B29K 2995/0092* (2013.01); *B33Y 80/00* (2014.12)

(58) Field of Classification Search
None
See application file for complete search history.

(56) References Cited

U.S. PATENT DOCUMENTS

| 8,216,674 B2 | 7/2012 | Simpson et al. | |
|---|---|---|---|
| 9,539,149 B2 | 1/2017 | Simpson et al. | |
| 2014/0094540 A1* | 4/2014 | Simpson | C09D 5/031 523/200 |
| 2014/0155522 A1* | 6/2014 | Simpson | C09D 127/22 523/400 |

FOREIGN PATENT DOCUMENTS

WO      2009012116 A2      1/2009

* cited by examiner

*Primary Examiner* — Michael P. Rodriguez
(74) *Attorney, Agent, or Firm* — Fox Rothschild LLP

(57) ABSTRACT

Nanoporous silica particles having a plurality of pores are mixed with a protective liquid which fills the pores to provide a protected particle mixture. The protected particle mixture is combined with a resin to provide a liquid coating precursor composition. The coating precursor composition is applied to the substrate, and the protective liquid is evaporated. The evaporating protective liquid forms a plurality of passages through the resin. Some of the passages percolate to an outer surface of the resin. Some of the nanoporous particles are distributed at walls of the passages, some of the nanoporous particles are embedded within the resin, and some of the nanoporous particles extend beyond the outer surface of the resin to form a superhydrophobic surface. The resin is cured to solidify the resin and to adhere the resin to the surface and to the particles. A composition and an article are also disclosed.

12 Claims, 11 Drawing Sheets

FIG. 11

LIQUID RESIN MODIFICATION FOR VOLUMETRIC SUPERHYDROPHOBIC 3D PRINTING

FIELD OF THE INVENTION

The present invention relates to 3D printing of superhydrophobic parts, and more particularly to compositions for the additive manufacturing of volumetric superhydrophobic parts.

BACKGROUND OF THE INVENTION

Additive manufacturing (also known as 3D printing) is changing the manufacturing world by allowing parts to be printed one layer at a time. A variety of different types of 3D printers and printed materials are emerging and currently under development. This includes a variety of 3D printers using different materials including both polymers and metals. No 3D printing of superhydrophobic materials or parts currently exists. The reason has to do with current superhydrophobic technologies being strictly a surface phenomenon. That is, currently superhydrophobic coatings are produced by nanopatterning or nanotexturing a hydrophobic surface, while 3D printing is a volumetric process of printing parts layer upon layer, one layer at a time. Hydrophobic surface chemistry and nanotextured or nanoporous surface topography creates a pinned thin layer of air on the surface which results in superhydrophobic (extreme water repellant) behavior. Anything below the surface tends to have no effect on the surface's behavior. If the surface is damaged in any way, the pinned air layer goes away and the surface's superhydrophobic behavior is destroyed. Since 3D printing is a volumetric technology without any surface nanotexturing ability, it tends to be incompatible with standard superhydrophobic technologies.

Curing as used herein can be defined as any process where heat or radiation is used to catalyze or initiate chemical and molecular-level structural changes in a polymeric material such as epoxies, phenolics, polyesters and silicones. This type of curing is a term in polymer chemistry and process engineering that refers to the toughening or hardening of a polymer material by cross-linking of polymer chains (polymerization), brought about by, heat or chemical additives. When the additives are activated by ultraviolet radiation, the process is called UV cure. The term polymer as used herein is a large molecule consisting of many repeating subunits. Resin is defined as a solid or viscous material which gives or become a polymer after curing.

One material used for 3D printing parts is Ultra-Violet (UV) curable liquid resin, where a 3D printer either extrudes a liquid resin through an orifice into a UV flooded compartment containing the part being printed, or an entire layer of liquid resin is imaged with UV light at a time. The ultraviolet radiation causes the resin to partially cure (harden) such that it forms a printed part layer. Additional layers are printed, one at a time. The result of printing multiple 2D layers is a 3D composite printed part. A 3D printing process that produced superhydrophobic printed part behavior would be a new capability of 3D printing and would likely advance superhydrophobic technology usage.

SUMMARY OF THE INVENTION

A method of making a volumetric superhydrophobic portion on a substrate includes the step of mixing nanoporous superhydrophobic particles having a plurality of pores with a protective liquid to provide a protected particle mixture with the protective liquid filling the pores of the particles. The protected particle mixture is combined with a resin to provide a liquid precursor composition. The precursor composition is applied to the substrate. The protective liquid is evaporated from the precursor composition, the evaporating protective liquid forming a plurality of passages through the resin, some of the passages percolating to an outer surface of the resin, and wherein some of the nanoporous superhydrophobic particles are distributed at walls of the passages, some of the nanoporous superhydrophobic particles are embedded within the resin, and some of the nanoporous superhydrophobic particles extend beyond the outer surface of the resin. The resin is cured to solidify the resin and to adhere the resin to the surface and to the particles. The evaporating step can include heating the precursor composition. The applying step can be by 3D printing.

The nanoporous particle can be silica, and the silica can include at least one selected from the group consisting of diatomaceous earth, fumed silica and silica aerogel. The surface of the nanoporous silica particles can be functionalized. The nanoporous particles can be functionalized by hydrophobic silanes bonded to surface silanol groups on the nanoporous particles. The nanoporous particles can be diatomaceous earth, and hydrophobic silanes are bonded to 4-6% of the surface silanol groups on the diatomaceous earth particles. The nanoporous superhydrophobic particles can be fumed silica, and hydrophobic silanes are bonded to 4-6% of the surface silanol groups on the fumed silica particles. The nanoporous particles can be silica aerogel, and hydrophobic silanes are bonded to 4-6% of the surface silanol groups on the silica aerogel particles.

The resin can be mechanically bonded to the nanoporous silica particles. The resin can be covalently bonded to 5-50% of the surface area of the nanoporous silica particles.

A composition is provided for the additive manufacture of articles having a volumetric superhydrophobic portion. The composition includes a mixture of a protected particle mixture comprising a plurality of nanoporous silica particles having a plurality of pores and a protective liquid, the protective liquid filling the pores of the particles, and a resin. The protective liquid can be hydrophilic.

An additive manufactured article can include at least one volumetric superhydrophobic portion formed from a composition comprising a mixture of a protected particle mixture comprising a plurality of nanoporous silica particles having a plurality of pores and a protective liquid, the protective liquid filling the pores of the particles, and a resin. A plurality of passages through the resin are formed by the evaporation of the protective liquid. Some of the passages percolate to an outer surface of the resin. Some of the nanoporous particles are distributed at walls of the passages, some of the nanoporous particles are embedded within the resin, and some of the nanoporous particles extend beyond the outer surface of the resin. The resin is cured after the formation of the passages.

BRIEF DESCRIPTION OF THE DRAWINGS

A fuller understanding of the present invention and the features and benefits thereof will be obtained upon review of the following detailed description together with the accompanying drawings, the invention not being limited to the arrangements and instrumentalities shown, wherein.

DETAILED DESCRIPTION OF THE INVENTION

Figure 1:
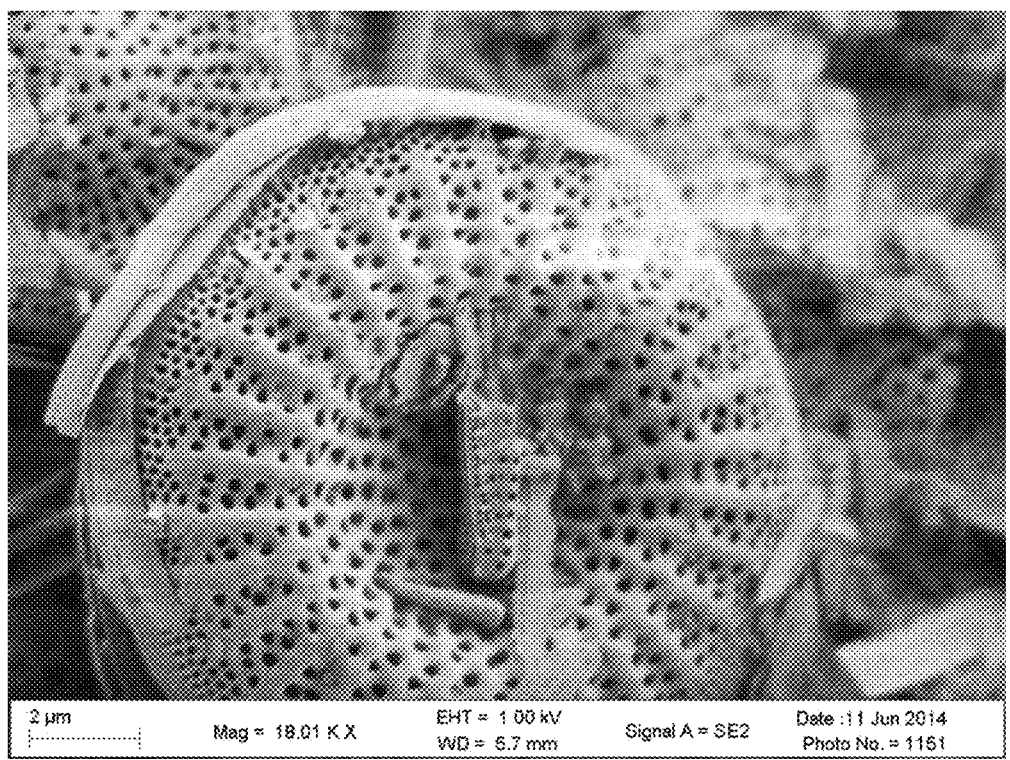
FIG. 1 is a Scanning Electron Micrograph (SEM) image of a superhydrophobic diatomaceous earth (SHDE) particle.

The following detailed description describes various features and functions of the disclosed methods, compositions, and structures. The illustrative embodiments described herein are not meant to be limiting. It will be readily understood that certain aspects of the disclosed methods, compositions, and structures can be arranged and combined in a wide variety of different configurations, all of which are contemplated herein.

A method of making a volumetric superhydrophobic portion on a substrate, or a volumetric superhydrophobic article, includes the step of mixing nanoporous particles having a plurality of pores with a protective liquid to provide a protected particle mixture with the protective liquid filling the pores of the particles. The protected particle mixture is combined with a liquid resin to provide a liquid coating precursor composition. The coating precursor composition is deposited or applied to the substrate. The protective liquid is evaporated from the precursor composition. The evaporating protective liquid forms a plurality of passages through the resin. Some of the passages percolate to an outer surface of the resin. Some of the nanoporous particles are distributed at walls of the passages. Some of the nanoporous particles are embedded within the resin. Some of the nanoporous particles extend beyond the outer surface of the resin. The resin is cured to solidify the resin and to adhere the resin to a substrate and to the particles.

The nanoporous particles can comprise suitable materials such as silica ($SiO_2$) and $TiO_2$. The nanoporous particles can be at least one selected from the group consisting of diatomaceous earth, fumed silica, and silica aerogel, nanoporous titanium, or titanium aerogel. The nanoporous particles must be superhydrophobic or capable of being functionalized to become superhydrophobic. Accordingly, such particles are referred to interchangeably as superhydrophobic nanoporous particles, superhydrophobic particles, or in the case where the nanoporous particle is diatomaceous earth, superhydrophobic diatomaceous earth (SHDE) particles.

The diameter of the nanoporous superhydrophobic particles can range from 0.05 to 200 µm. The diameter of the superhydrophobic particles can be between 1-100 µm. The diameter of the superhydrophobic particles can be between 10-50 µm. The diameter of the superhydrophobic particles can be 0.05, 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, and 200 µm, or within a range of any high and low value selected from these values.

As used herein, the term "nanopores" refers to pores with a major diameter ranging from 1 to 400 nm. Nanopores can also refer to pores having a major diameter ranging from 5 to 200 nm, or 10 to 100 nm, or any combination thereof, e.g., 40 to 75 nm and surface areas of at least 1 $m^2/g$. Particle surface areas can range from 1 $m^2/g$ to 1000 $m^2/g$, depending on the type of nanoporous particles used. Examples of the type of particles that can be used include superhydrophobic diatomaceous earth with a surface area range from 1 $m^2/g$ to 100 $m^2/g$, superhydrophobic fused silica with a surface area range from 20 $m^2/g$ to 380 $m^2/g$, and superhydrophobic aerogel with a surface area range from 200 $m^2/g$ to 1000 $m^2/g$.

The pore volume of any or all of the superhydrophobic particles and/or the average pore volume of the superhydrophobic particles can be 0.1-5 ml/g. The pore volume of the superhydrophobic particles can be 0.1, 0.2, 0.3, 0.4, 0.5, 0.6, 0.7, 0.8, 0.9, 1, 2, 3, 4 or 5 ml/g, and within a range of any high and low value selected from these values.

The surface area of any or all of the superhydrophobic particles and/or the average surface area of any or all of the superhydrophobic particles can be 1-1000 $m^2/gm$. The average surface area of the superhydrophobic particles can be 1, 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 $m^2/gm$, or within a range of any high and low value selected from these values.

The surface of the nanoporous particles can be functionalized to render the nanoporous particles superhydrophobic. This is particularly necessary where the material comprising the nanoporous particles is otherwise hydrophilic, such as silica. The nanoporous particles can be functionalized by hydrophobic compounds that are bonded to the surface of the nanoporous silica (or titanium) particles. The combination of the surface nanotexture of the nanoporous particles with the hydrophobic coating renders the surface of the particle superhydrophobic. For example, hydrophobic silanes can be bonded to surface silanol groups on the nanoporous silica particles. The nanoporous particles can be diatomaceous earth. The surface of the diatomaceous earth can be functionalized to create superhydrophobic diatomaceous earth (SHDE). FIG. 1 is a Scanning Electron Micrograph (SEM) image of a superhydrophobic diatomaceous (SHDE) particle. SHDE particles are covered with sub-100 nm nanopores. The nanoporous particles, whether functionalized or not, should be superhydrophobic particles.

Diatomaceous earth is a chalk-like, soft, friable, earthy, very fine-grained, siliceous sedimentary rock usually light in color, although white when pure. It is very finely nanoporous and is very low in density, such that it floats on water until its surface is wetted. Diatomaceous earth is chemically inert in the presence of most liquids and gases. It also displays low thermal conductivity and a high fusion point. Many sediments and sedimentary rocks are somewhat diatomaceous. The deposits result from an accumulation in oceans or fresh waters of the amorphous silica (opal, ($SiO_2$ $nH_2O$) cell walls of dead diatoms, which are microscopic single-cell aquatic plants (algae). The fossilized skeletal remains—a pair of shells (frustules)—vary in size from less than 1 micron to more than 1 millimeter but are typically 10 to 200 microns across. The frustules have a broad variety of delicate, lacy, perforated shapes ranging from discs and balls to ladders, feathers, and needles. This variety of shapes produces the partitioned surface of DE that provides the surface topography conducive to the superhydrophobic properties of the present invention. A typical chemical composition of diatomaceous earth is about 92% silica, 2% sodium, 2% magnesium and 1% iron.

Superhydrophobic diatomaceous earth (SHDE) is described in detail U.S. Pat. No. 8,216,674 to Simpson et al., issued on Jul. 10, 2012, the disclosure of which is hereby incorporated fully by reference. Such superhydrophobic diatomaceous earth particles can be employed as the superhydrophobic particles according to various embodiments.

Examples of superhydrophobic nanoporous particles include, but are not limited to, superhydrophobic diatomaceous earth (SHDE), superhydrophobic fumed silica, and superhydrophobic $TiO_2$, and superhydrophobic aerogels. The example of SHDE will be used herein but should be considered interchangeably to denote other superhydrophobic nanoporous particles.

The invention provides liquid curable resins that, when used in conjunction with 3D printers, results in printed parts having volumetric superhydrophobic behavior. The term "volumetric superhydrophobic," as used herein means that the entire volume of the article or a portion of the article is, or can be, made superhydrophobic, and not just the surface. If a volumetrically superhydrophobic part has its surface abraded away, the new surface retains much of its superhydrophobic behavior. The compositions of the invention maintain the resin's viscosity and UV curability, while making 3D printed parts volumetrically superhydrophobic after curing.

A protective liquid is provided and wets the superhydrophobic nanoporous particles while at the same time preventing the same particles from being substantially wetted by liquid resins. The term "protective liquids" as used herein is defined as any liquid that fills the nanopores of a nanotextured or nanoporous particle, and prevents or inhibits the free flow of liquid resin into the nanopores. The protective liquid can be any suitable liquid capable of wetting the superhydrophobic particles, filling the pores, and being immiscible and non-reactive with the resin, and capable of evaporation in the processing time and temperatures of the desired process. The protective liquid can be a fluorinated liquid such as FC-40, FC-770 and other Fluorinert solvents or other fluorinated solvents, like 3M's Novec 7500 solvent (3M, Minneapolis Minn.). Other examples of protective liquids are low viscosity (evaporative) PDMS (polydimethylsiloxane), paraffins (Exxon-Mobil's Isopar-C) or other evaporative siloxanes.

It is necessary that the protective liquid evaporates, or partially evaporates from the resin surface during resin curing in order for the cured part surface to have superhydrophobic behavior. By evaporation, it is meant that greater than 50% of the exposed to the atmosphere protective liquid evaporates during resin curing. Ideally, 100% of the exposed to atmosphere protective liquid will evaporate during resin curing. The amount of protective liquid that evaporates can be 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 and 100%, and within a range of any high and low value selected from these values.

In general, any evaporative liquid that is immiscible with the liquid resin can act as a protective liquid. Immiscibility is defined herein as the property where two liquids normally being incapable of mixed or blended together. Immiscible liquids that are shaken together eventually separate into layers. For instance, oil and water are immiscible. The protective liquid can be hydrophilic, as long as the hydrophilic protective liquid does not leach out of the superhydrophobic particle's nanopores before resin curing begins. Such leaching can cause the liquid resin to emulsify, producing a foaming action. Such emulsification (foaming) could be advantageous in certain instances, but it would likely affect printing behavior and performance by reduced layer-to-layer adhesion, abrasion resistance, and superhydrophobic behavior. Superhydrophobic nanoporous particles, wetted with a hydrophobic protective liquid is preferred. For example, the SHDE's nanopores hold the protective liquid by both capillary and Van der Waals forces. The superhydrophobic particles used herein were diatomaceous earth that were hydrophobically functionalized with a hydrophobic silane. The functionalizing silanes do not necessarily completely penetrate the pores, and can incompletely cover the particle surface. But, there is enough chemical compatibility between a hydrophobic protective liquid and the SHDE's functionalization (hydrophobic silane) chemistry to prevent emulsification while protecting SHDE's surface and nanopores from excessive resin intrusion.

Figure 2:
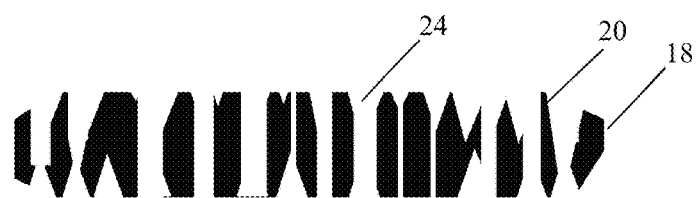
FIG. 2 is a schematic diagram of a cross-section of a SHDE particle.
Figure 3:
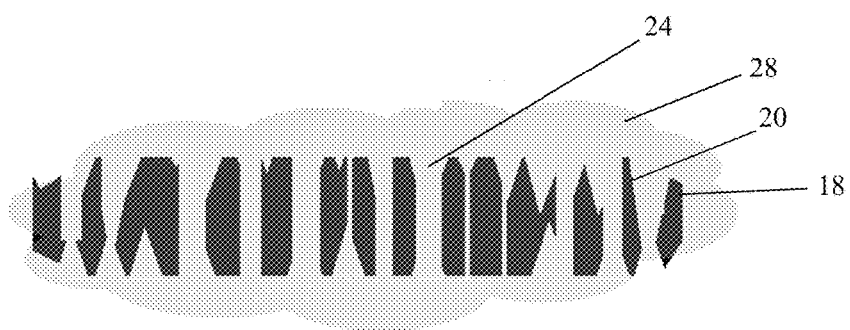
FIG. 3 is a schematic diagram of a cross-section of a SHDE particle filled (wetted) with a protective liquid.

The term "wetting" as used herein means the covering of a superhydrophobic particle's surface and filling of the particle pores by a liquid. The nanoporous superhydrophobic particles get fully wetted by the protective liquid prior to being mixed with liquid resin. This is shown schematically in FIG. 2 before wetting of the superhydrophobic nanoporous particle 18 by the protective liquid, with the nanostructured pore walls 20 creating surface texture and also nanopores 24. FIG. 3 shows a schematic diagram of a cross-section of a SHDE particle wetted with the protective liquid 28. The protective liquid 28 fills the pores of the silica particles. The full wetting of nanoporous silica by the protective liquid as shown in FIG. 3 prevents or inhibits the wetting of the nanoporous silica by the liquid resin. As shown, the protective liquid 28 can also pool around the SHDE particle.

The silica particles can be immersed in the protective liquid such that the resulting protected particle mixture has an amount of protective liquid far exceeding the amount required to fill the volume of the nanopores of the silica particles. The nanoporous superhydrophobic particles with filled pores will thereby accumulate to some extent in pools of protective liquid when mixed with the resin and deposited. When protective liquids are added to SHDE or other nanoporous superhydrophobic particles, the liquid fills and becomes pinned in the nanopores. If the protective liquid and SHDE surface both have a fluorinated chemistry, there is a strong Van der Waals hydrogen bond force that pins the protective liquid to the SHDE pores and on its surface. This protects the majority (>50%) of the particle's outer surface nanopores from being filled with liquid resin before and during the resin curing stage.

Figure 4:
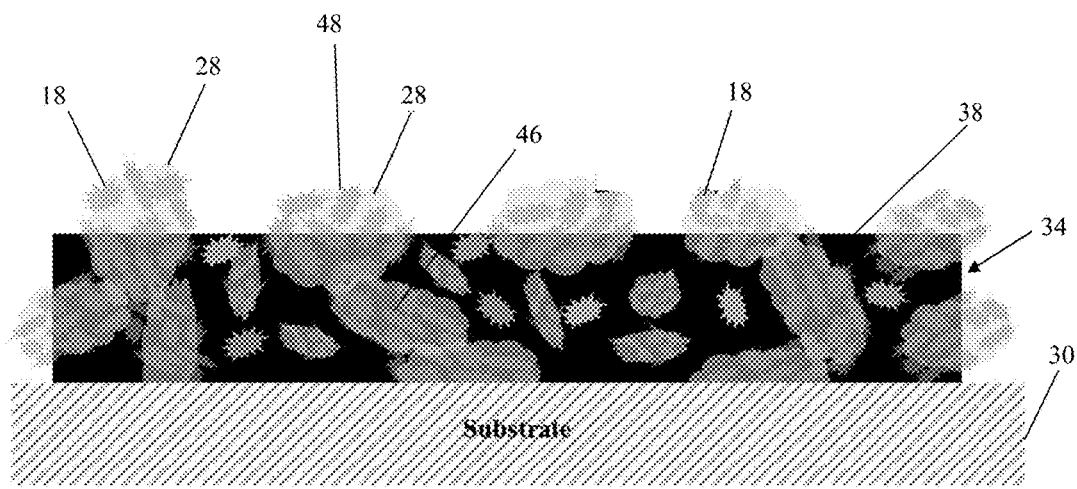
FIG. 4 is a schematic diagram of a 3D printed cross-section of locally clustered SHDE particles wetted by protective liquid and in liquid resin.

The protected particle mixture comprising the wetted superhydrophobic particles and protective liquid is then mixed with liquid resin and forms the precursor composition. The precursor composition including the resin, protective liquid and silica particles is then deposited, as by an additive manufacturing process. This is shown in FIG. 4. As can be seen from FIG. 4, the precursor composition 34 can be deposited on a substrate 30. Resin 38 surrounds pools 46 of the protective particle mixture comprising superhydrophobic nanoporous particles 18 and protective liquid 28, with the pools 46 being below the surface of the resin 38 and some pools 48 percolating through the surface of the resin 38. Some of the superhydrophobic particles 18 are in relatively large pools of the protective liquid. Some of these large pools of protective liquid percolate to the surface of the deposited layer to form macropores in the resin.

Figure 5:
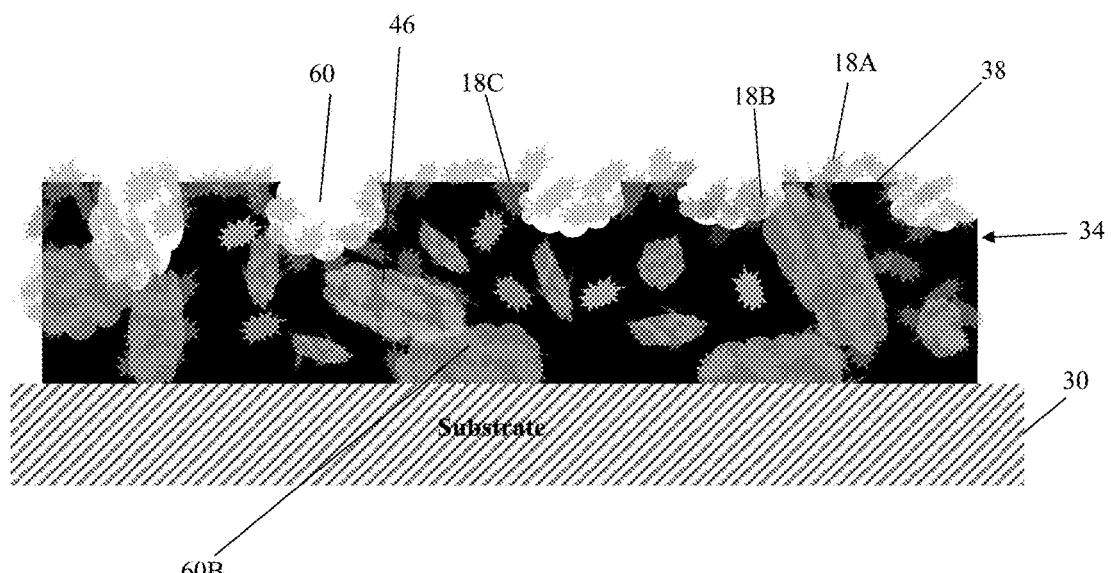
FIG. 5 is a schematic diagram of a 3D printed cross-section of locally clustered and wetted SHDE particles just before a second layer is printed, showing macro-pores on the cured resin surface due to protective liquid evaporation.

The protective liquid starts to evaporate after deposition of the precursor composition and continues during the curing of the resin. Any suitable evaporation process can be utilized. The evaporating step can include heating the precursor composition. The evaporation of protective liquid from the precursor composition pools 46 forms macropores 60 in the resin 38 as shown in FIG. 5. Some of the macropores 60 percolate to an outer surface of the resin 38. The superhydrophobic nanoporous particles 18 are adhered to the resin 38. Some of the nanoporous superhydrophobic particles 18A extend beyond the outer surface of the resin. Some of the nanoporous particles 18B migrate to and are distributed at walls of the macropores 60 as the protective liquid evaporates. Some of the nanoporous particles 18C are embedded within the resin. Some of the wetted SHDE pools get engulfed (trapped) in the resin during curing. Once the resin completely cures, some of the trapped wetted SHDE pools may not evaporate until resin abrasion occurs, at which time the trapped protective liquid will evaporate. The relative resin curing rate and protective liquid evaporation rates can be important. For instance, in the case of 3D extrusion printing, if the protective liquid completely evaporated before any resin curing occurred, there would not be any protection against resin wetting the silica particles and filling their nanopores thus preventing superhydrophobic behavior. Likewise, if no significant protective liquid evaporation occurred before the next part layer was deposited, then there would be no, or very little bonding between layers. This would result in a printed piece that falls apart.

Figure 6:
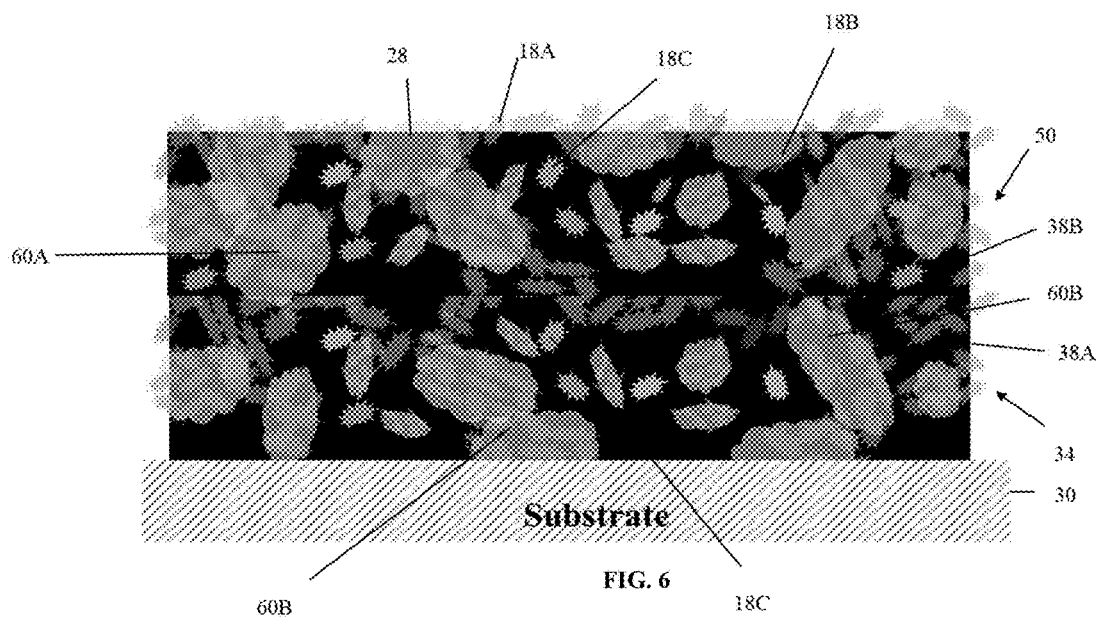
FIG. 6 is a schematic diagram of a cross-section of two 3D printed layers, showing the macro-pores of FIG. 5 filled with freshly deposited liquid resin.

A primary objective of 3D printing is to form solid parts. Therefore, bonding one layer to the previous layer is a priority, as shown in FIG. 6 where a second layer 50 of precursor composition is deposited on the first layer 34 of precursor composition, where a layer of resin 38B is deposited over the layer 38A. Macropores 60A and 60B are formed by pockets of the protected particle mixture trapped in the resin. In the layer 50 are particles 18A extending beyond the new surface, particles 18B in the macropores 60, and particles 18C that are embedded within the new layer of resin 38B.

The deposition of multiple layers of the precursor composition requires that most of the previous layer's resin surface must be free of protective liquid (<50% of protective liquid on the previous layer's surface) at the time of layer deposition (printing). This means the either the evaporation rate of the protective liquid needs to be relatively high, or the time between deposition of layers must be relatively long, or both. While delaying layer depositions to insure adequate protective liquid evaporation is a possible option, it would slow down the printing process, so the protective liquid evaporation rate should be relative high. To achieve a high evaporation rate relative to the resin cure rate may require a high evaporation rate protective liquid, thermally heating the part being printed, and a low relative humidity atmosphere environment, or a partial vacuum environment. Thus, it is much more important that the protective liquid to evaporate at a high rate, and thus not affect layer to layer bonding, than it is to match protective liquid evaporation rates with resin curing rates.

The primary objective of this invention is to 3D print parts having volumetric superhydrophobic behavior. To accomplish this, the protective liquid must keep most (>50%) of the liquid resin out of both the resin's micropores and the silica's nanopores until the resin starts curing (hardening). The 3D printing process, by its nature, uses liquid resins that start curing almost immediately after being deposited (otherwise previous layers couldn't support the current printed layer), this means that even a relatively fast evaporation rate of the protective liquid is not likely to cause resin micropores or silica nanopores to be filled with resin, because the resin starts curing before any substantial evaporation could occur. Thermal heating and low humidity enhances evaporation rates and may increase curing rates, depending on the type of resin used. How much UV radiation, and, or thermal heat to use is dependent on the specific printing environment, specific resin being used, and it's curing rate characteristics. Likewise, the protective liquid evaporation rate is dependent on type of protective liquid used, thermal temperature, airflow, and relative humidity. For instance, FC-40 has a boiling point of 165° C. (and a vapor pressure of 287 Pa), while FC-770 has a boiling point of 95° C. (vapor pressure of 6800 Pa), and Isopar-C has a boiling point of 98° C. (vapor pressure of 4000 Pa). This indicates that FC-40 has a much lower vapor pressure than FC-770 or Isopar-C and if used as the protective liquid, it will evaporate much slower than either FC-770 or Isopar-C, and probably inhibit the overall part cohesion. Different resins have similar variations. A well bonded volumetric superhydrophobic 3D printed part, requires the right combination of liquid resin, protective solvent, and printer environmental conditions. The percent coverage of protective liquid on the previously deposited resin surface being currently printed can be 50%, 45%, 40%, 35%, 30%, 25%, 20%, 15%, 10%, 5%, or 0%, or within a range of any high and low value selected from these values.

Figure 7:
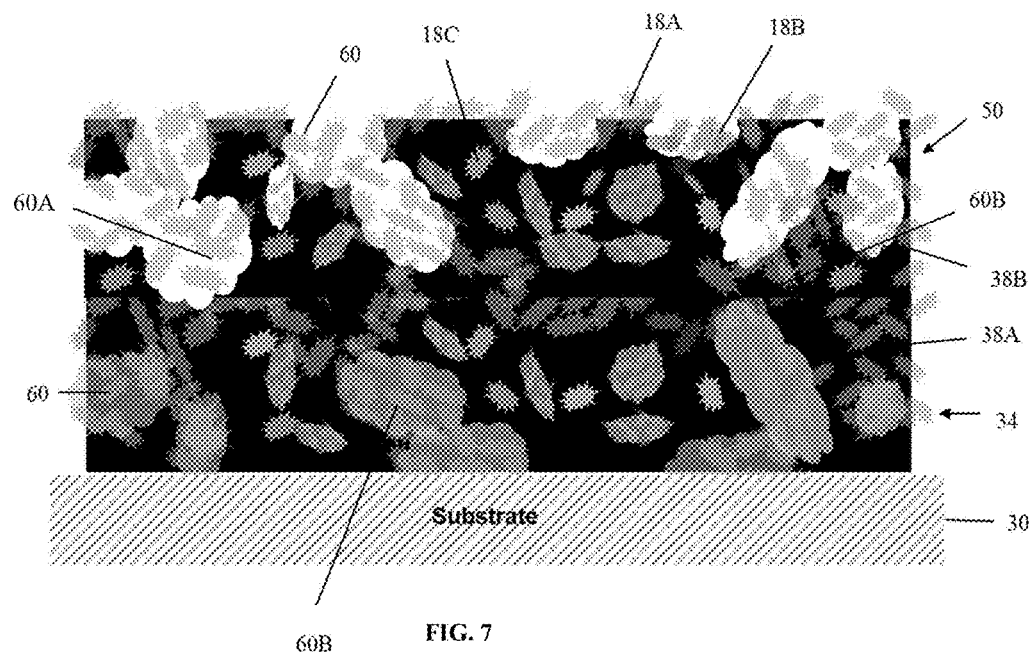
FIG. 7 is a schematic diagram of a cross-section of layers of volumetric superhydrophobic material deposited on a substrate after resin curing and exposed protective liquid evaporation.

FIG. 7 is an illustration of the cross-section of a volumetric superhydrophobic 3D printed part after two layers 34 and 50 have been printed. The new precursor composition layer 50 wets the previous layer where evaporation occurred and fills any surface macropores not containing protective liquid. Evaporation of the protective liquid forms macropores 60B that are devoid of protective liquid, while macropores 60B that are encased within resin will not have protective liquid evaporation until abrasion of the resin above the macropore 60A exposes the protective liquid therein to the atmosphere.

Figure 8:
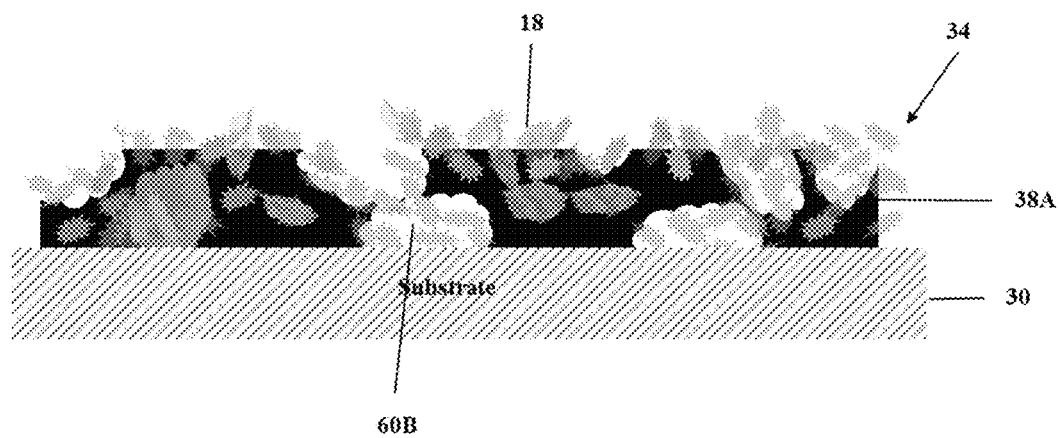
FIG. 8 is a schematic diagram of a cross-section of the layers of volumetric superhydrophobic material on a substrate after abrasion.

FIG. 8 is a cross-sectional illustration of the part after the layer 50 has been removed by abrasion. The resin above the macropore 60A has been removed, permitting the evaporation of the protective liquid from the macropore. Also, new particles 18C that were once embedded with the resin 38A are now exposed at the abraded surface, and particles 18B lining the macropore 60A are now also exposed. Superhydrophobic particles that were below the surface are now exposed at the surface, and maintain the superhydrophobicity of the surface of the part. The part is therefore seen to be volumetrically superhydrophobic.

Figure 9:
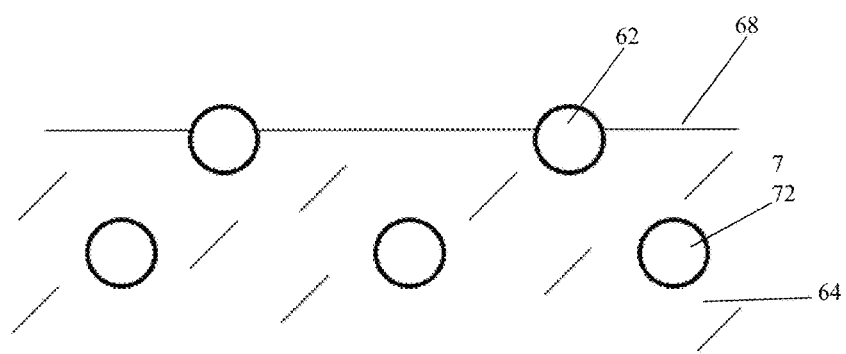
FIG. 9 is a schematic diagram of individual SHDE particles in a resin.
Figure 10:
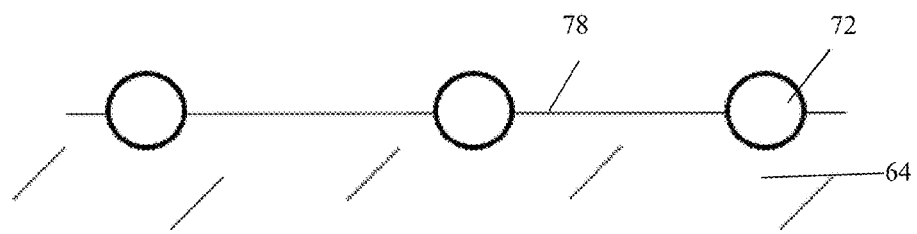
FIG. 10 is a schematic diagram of the SHDE particles of FIG. 9 after abrasion of the surface.

FIGS. 9-10 are schematic diagrams illustrating in the maintenance of the superhydrophobicity of the surface after abrasion. FIG. 9 illustrates the volumetric superhydrophobic layer with a resin matrix 64 and embedded superhydrophobic particles 72. Some of the superhydrophobic particles 62 extend beyond the surface 68 of the resin 64, imparting superhydrophobicity to the surface. FIG. 10 is schematic diagram of the layer after abrasion of the surface. Embedded particles 72 now appear at the after-abrasion surface 78 of the layer. These particles maintain the superhydrophobicity of the new surface, and render the part or the surface of the part volumetrically superhydrophobic.

Figure 11:
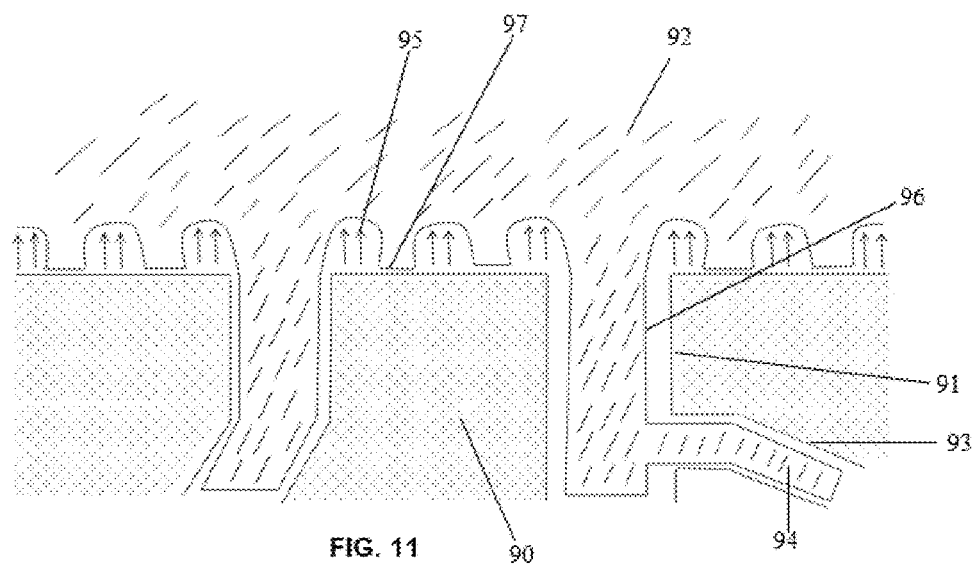
FIG. 11 is a schematic diagram of a cross section of an SHDE particle having resin mechanically locking to the particle in the particle pores.

Mechanical bonding occurs during the resin's curing phase when protective liquid evaporates enough such that some of the uncured resin enters the particle's nanopores and micropores as shown in FIG. 11. When the resin 90 cures (hardens), liquid resin 96 in the pores 91 of the nanoporous superhydrophobic particles chemically and mechanically bonds to the SHDE particles through branches 94 which extend into non-vertical branches 93 formed in the resin 90. FIG. 11 also illustrates that the functionalizing silanes 95 do not completely cover the surface of the particles. The resin can be hydrophilic and therefore is repelled from the hydrophobic silanes. The resin is attracted to the hydrophilic silica regions, and bonds with surface silanol groups on the silica surface at bonding sites 97.

It is desirable that the protective liquid and the superhydrophobic nanoporous particles have compatible chemistries. For example, the protective liquid can be a fluorinated liquid such as FC-40 or FC-770 and the surface of the nanoporous particle can be functionalized with a hydrophobic fluorinated silane. In this case, the protective liquid and the SHDE's surface chemistries are both hydrophobic and fluorine based. This results in hydrogen bonding Van der Waals forces between them. This Van der Waals force-based hydrogen bonding pins the protective liquid in SHDE's nanopores. Since the protective liquid is immiscible with liquid resin, one familiar in the art would assume that the two would simply phase separate. A third component is the superhydrophobic nanoporous particle such as silica, which is attracted to both the liquid resin and the protective liquid by Van der Waals forces. This mutual attraction of SHDE to two normally immiscible liquids has unexpected effects on both miscibility and mixture concentrations. By modifying liquid resins with SHDE (or any other nanoporous hydrophobic silica particles) wetted with a normally immiscible protective liquid (like 3M's Fluorinated solvents), the precursor composition so formed can be used to print 3D print volumetric parts.

The precursor composition of the invention has a surprising set of features. The first such feature is that SHDE wetted with an inert protective liquid, mixes and disperses well with an otherwise immiscible liquid resin without substantial phase separation to form the precursor composition. This mixing capability is surprising because of the immiscibility of the two liquids in question. This is even more surprising when one considers what happens when protected liquid wetted DE is added to liquid resin. When wetted DE (naturally hydrophilic diatomaceous earth) is combined with liquid resin, a foam like emulsion is formed. In addition, the protective liquid is no longer protecting the diatomaceous earth's nanopores, and allows liquid resin to wet the DE and fill its nanopores. Since diatomaceous earth is extremely hydrophilic it's Van der Waals forces are very weak toward the protective liquid and a fluorinated liquid (like FC-40) easily leaches out of the pores of diatomaceous earth. SHDE has a hydrophobic (fluorinated) surface chemistry, which creates strong hydrogen bonding Van der Waals forces between SHDE and the protective liquid. This result is a pinned protective liquid in the SHDE nanopores, and results in resin-free SHDE pores after resin curing. Both surface and liquid being hydrophobic (in the case of FC-40 and SHDE, both chemistries are fluorinated), promotes hydrogen bonding due to strong hydrogen bond attractive Van der Waals forces.

The volumetric superhydrophobic compositions of the invention are covered with different size pores ranging from macropores to micropores, to nanopores covering the entire surface. The macropore and micropore walls formed in the resin are covered and bonded with nanoporous superhydrophobic diatomaceous earth particles. The term macropore as used herein refers to cured resin pore diameters that range from 50 microns to 500 microns. The term micropore as used herein refers to cured resin pore diameters from 1 to 50 microns. The pores of the SHDE which have been largely preserved by the protective liquid, are nanoporous. As noted, many surfaces of the SHDE particles are exposed to the surrounding atmosphere by their protrusion at the surface and lining the macropores of the resin. The macro-porous and microporous cured resin has pore diameters ranging from 5 microns to 500 microns. The surface of the resulting part is not only covered and bonded with SHDE, but its macro-pores and micro-pore walls are also covered and bonded with nanoporous SHDE particles. The result is a volumetric superhydrophobic printed part. The strong attraction of SHDE to a protective liquid in conjunction with a liquid resin allows the unexpected near uniform mixing of all three components. While there are some localized clusters of wetted SHDE particles that form macro-pores during curing, the micro-pores are produced by smaller groups of wetted SHDE particles which are present throughout the entire cured resin volume. The porous topology of the resin and the presence of many nanoporous SHDE particles on all surfaces of the resin provides an extreme water repulsion that is maintained even after abrasion of the surface.

It might be expected that the mixture of liquid resin and wetted SHDE would dramatically affect the mixture's viscosity. But, much of the protective liquid gets pinned and concentrated in the superhydrophobic silica particles (SHDE) nanopores. This protective liquid pinning in SHDE's pores has a surprising set of effects. First, the normal and expected immiscibility between the liquid resin and protective liquid is greatly reduced and allows the two to be mixed together without the normal amount of phase separation. Also, the protective liquid on the SHDE surfaces reduces the SHDE's physical interaction with the liquid resin, effectively shielding the SHDE from liquid resin interaction. Thus, the expected viscosity increase, and cure rate change are greatly reduced. That is, the protective liquid not only protects particle pores from liquid resin intrusion, it also shields, or hides, the particle surfaces from liquid resin interaction and expected viscosity increase. This results in localized pools of wetted SHDE clusters throughout the solution. FIG. 4 is an illustration of this localized clustering of wetted SHDE particles 46 when mixed with liquid resin 38 and printed onto a substrate 30. Note that the resin doesn't bond to the substrate in a continuous layer, but bonds at localized regions, where wetted clusters of SHDE are not present.

FIG. 5 is a cross-sectional illustration of wetted and clustered SHDE particles in liquid resin after the protective liquid has experienced surface evaporation. The localized and clustered SHDE particles spread over the outer surface of the resin and become bonded after surface evaporation of the protective liquid. After the mixture's initial mixing, there is a localized phase separation (clustering) due to the wetted SHDE's dual attractiveness and repulsiveness to liquid resin. Until curing and protective liquid evaporation, the superhydrophobic silica particles and their nanopores are protected from resin bonding and intrusion. When the precursor composition is deposited onto a surface area of no, or very little, protective liquid, it bonds to the substrate. The wetted SHDE clustered concentrations within the liquid resin have two surprising effects. First, they prevent the resin from uniformly covering the surface, due to the localized phase separation and immiscibility of the protective liquid with the liquid resin. This creates macro-pore throughout the volume of the printed resin as shown in FIG. 4. The second surprising effect is the relatively small amount of resin viscosity change when a mixture containing SHDE is added to it.

Bonding of the SHDE particles to the curing resin occurs when the "protective liquid" evaporates (see FIG. 5). This bonding occurs on the macro-pore and micro-pore walls as well as on the curing resin outer surface. As the protective liquid evaporates, macro-pores begin to form and the SHDE chemically and mechanically bonds to the partially cured resin surface and pore walls. FIG. 6 illustrates that when a new layer of liquid precursor is deposited the precursor quickly fills any unprotected macro or micro-pores on the previous layer's surface and starts forming its own set of macro and micro-pores upon curing of and evaporation from the surface. FIG. 7 illustrates how macro-pores are formed after evaporation and how wetted pools of SHDE can get trapped within the cured part resin.

A composition for the additive manufacture of articles can be packaged for supply to manufacturers of such articles containing volumetric superhydrophobic portions. The composition will include a mixture of a protected particle mixture comprising a plurality of superhydrophobic nanoporous particles having a plurality of pores and a protective liquid, with the protective liquid filling the pores of the particles, and a resin.

An additive manufactured article comprises at least one volumetric superhydrophobic portion that is formed from a composition comprising a mixture of a protected particle mixture that includes a plurality of nanoporous superhydrophobic particles and a protective liquid, where the protective liquid fills the pores of the particles, and a resin. A plurality of passages through the resin are formed by the evaporation of the protective liquid. Some of the passages percolate to an outer surface of the resin. Some of the nanoporous particles are distributed at walls of the passages. Some of the nanoporous particles are embedded within the resin. Some of the nanoporous particles extend beyond the outer surface of the resin. The resin is cured after the formation of the passages.

The applying step can be any suitable additive manufacturing process such as 3D printing via liquid UV curable extrusion, and Continuous Liquid Interface Production technology (CLIP). The CLIPs process doesn't deposit resin on a substrate, but instead UV radiation images an entire layer at a time. Each layer is usually imaged and starts curing at the bottom of a pool of resin, constantly raising the part up and out of the pool incrementally after each UV image exposure. This invention should work just as well, or better, on a CLIPs 3D printer as with an extrusion type printer. The main difference is the resin starts curing within the resin pool instead of on a substrate surface. Since curing and bonding between layers is accomplished within the resin pool, the same thing should occur using the precursor liquid, except that the UV radiation bonding wouldn't be as strong, but mechanical bonding could be better, since cured resin would be, at least partially, present in all the macro-pores after resin curing and protective liquid evaporation.

Figure 12:
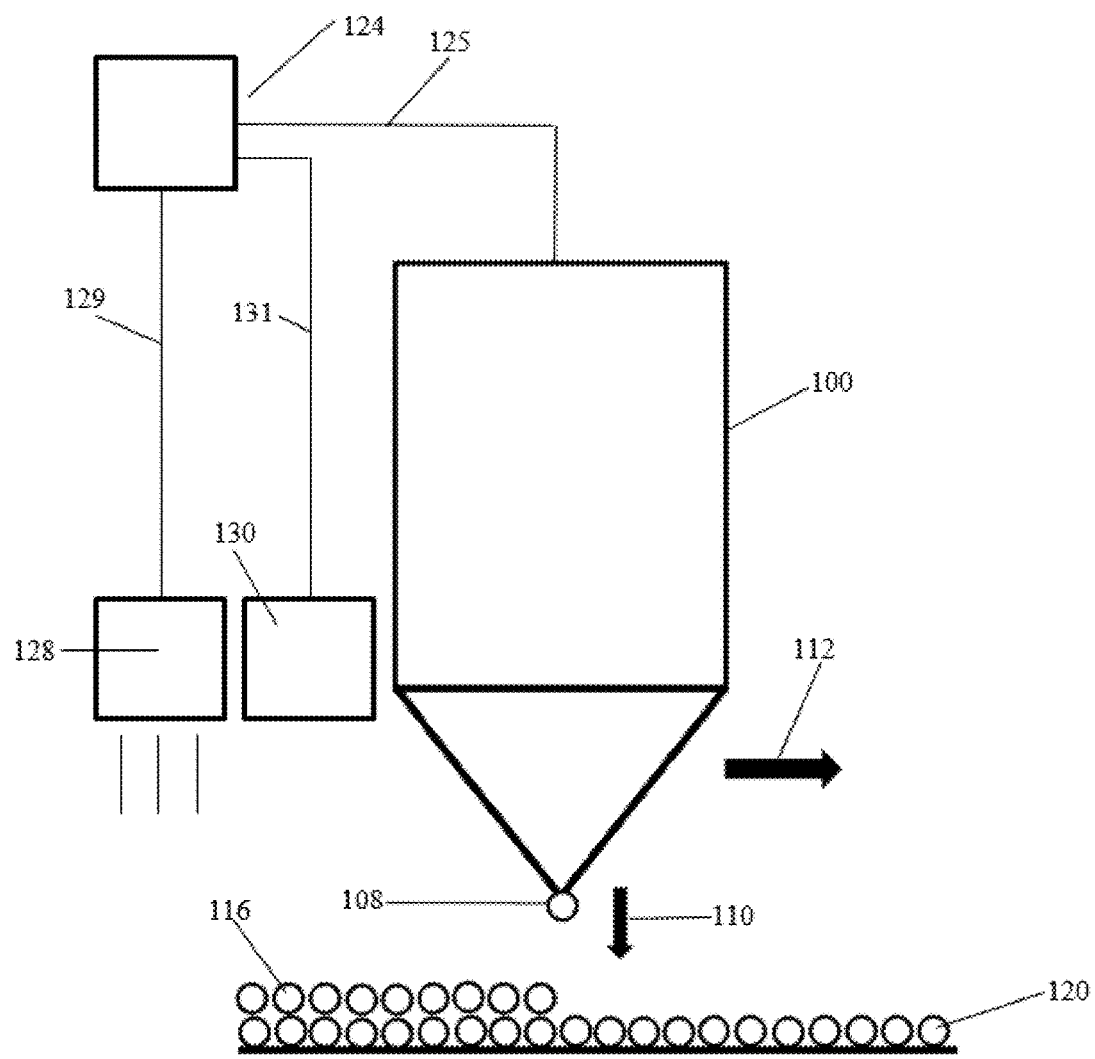
FIG. 12 is a schematic illustration of an additive manufacturing process according to the invention.

The modified resin precursor composite does not have to be printed in order to be part of an additive manufacturing process. For instance, it could be sprayed or brushed onto a part or substrate to make the part's surface volumetrically superhydrophobic. Other deposition methods other than additive manufacturing processes can be utilized. A process is shown in FIG. 12. A print head 100 applies droplets 108 of precursor composition as shown by arrow 110. A layer 116 can be applied over a previously deposited layer 120 as is known in additive manufacturing. The print head 100 moves in the direction of arrow 112, and direction is controlled according to a suitable processor 124. A UV or other radiation source 128 can be provided to effect curing of the resin. A heater 130 can alternatively be provided to cure the resin, or the heater 130 can be provided in addition to the resin curing source 128 to facilitate the evaporation of protective liquid from the deposited droplets 108. The radiation source 128 and the heater 130 as well as other process components can be controlled by the processor 124. Control can be wired or wireless. A control line 125 can be provided to control motion of the print head 100, a control line 129 can be provided to control the radiation source 128, and a control line 131 can be provided to control the heater 130.

Since 3D printing is done one layer at a time, it is possible to selectively print with the precursor compositions of the invention for only certain layers or areas of the printed part, thus making the part superhydrophobic in any predefined area or region of the part, or to make the entire volume of the part superhydrophobic.

A "hydrophobic" material or surface as used herein is a material that exhibits a contact angle within a range having a lower limit and/or an upper limit. The range can include or exclude the lower limit and/or the upper limit. The lower limit and/or upper limit can be selected from 90, 90.5, 91, 91.5, 92, 92.5, 93, 93.5, 94, 94.5, 95, 95.5, 96, 96.5, 97, 97.5, 98, 98.5, 99, 99.5, 100, 100.5, 101, 101.5, 102, 102.5, 103, 103.5, 104, 104.5, 105, 105.5, 106, 106.5, 107, 107.5, 108, 108.5, 109, 109.5, 110, 110.5, 111, 111.5, 112, 112.5, 113, 113.5, 114, 114.5, 115, 115.5, 116, 116.5, 117, 117.5, 118, 118.5, 119, 119.5, 120, 120.5, 121, 121.5, 122, 122.5, 123, 123.5, 124, 124.5, 125, 125.5, 126, 126.5, 127, 127.5, 128, 128.5, 129, 129.5, 130, 130.5, 131, 131.5, 132, 132.5, 133, 133.5, 134, 134.5, 135, 135.5, 136, 136.5, 137, 137.5, 138, 138.5, 139, 139.5, 140, 140.5, 141, 141.5, 142, 142.5, 143, 143.5, 144, 144.5, 145, 145.5, 146, 146.5, 147, 147.5, 148, 148.5, 149, and 149.5 degrees. For example, according to certain preferred embodiments, a "hydrophobic" surface is a surface that exhibits a contact angle of 90 degrees or greater with a drop of water.

A "superhydrophobic" surface as used herein is a surface that exhibits a contact angle within a range having a lower limit and an upper limit. The range can include or exclude the lower limit and/or the upper limit. The lower limit and/or upper limit can be selected from 150, 150.5, 151, 151.5, 152, 152.5, 153, 153.5, 154, 154.5, 155, 155.5, 156, 156.5, 157, 157.5, 158, 158.5, 159, 159.5, 160, 160.5, 161, 161.5, 162, 162.5, 163, 163.5, 164, 164.5, 165, 165.5, 166, 166.5, 167, 167.5, 168, 168.5, 169, 169.5, 170, 170.5, 171, 171.5, 172, 172.5, 173, 173.5, 174, 174.5, 175, 175.5, 176, 176.5, 177, 177.5, 178, 178.5, 179, 179.5, and 180 degrees. For example, according to certain preferred embodiments, a "superhydrophobic" surface is a surface that exhibits a contact angle of 150 degrees or greater with a drop of water.

Nanoporous silica can be functionalized to be superhydrophobic by the application of a hydrophobic self-assembled monolayer (SAM). SAM refers to a self-assembled monolayer surface treatment that produces a hydrophobic surface chemistry. SAM application methods are advantageous over alternate surface treatment techniques that can be used in the practice of the invention. Exemplary SAM application methods can include chemical vapor deposition. SAMs of the present invention can be prepared by adding a melt or solution of the desired SAM precursor onto the substrate surface where at least a sufficient concentration of SAM precursor is present to achieve an effectively continuous conformal monolayer. After the hydrophobic SAM is formed and fixed to the DE surface, any excess precursor can be removed by a volatizing or washing step. In this manner the SAM air interface can be primarily or exclusively dominated by the hydrophobic moiety.

One example of a SAM precursor which can be used in an embodiment of the invention is tridecafluoro-1,1,2,2-tetrahydroctyltrichlorosilane. This molecule undergoes condensation with the silanol groups of the DE surface releasing HCl and bonding the tridecafluoro-1,1,2,2-tetrahydroctylsilyls group to the surface of the heat-treated DE via a Si—O covalent bond. The tridecafluorohexyl moiety of the tridecafluoro-1,1,2,2-tetrahydroctylsilyl groups attached to the DE surface provide a monomolecular layer that has a hydrophobicity similar to polytetrafluoroethylene. Hence, by the use of such SAMs, the DE retains the desired partitioned surface structure while rendering that partitioned surface hydrophobic by directing the perfluorohexyl moiety to the air interface thereby yielding the desired superhydrophobic powder.

A non-exclusive list of exemplary SAM precursors that can be used for various embodiments of the invention is: $X_y(CH_3)_{(3-y)}SiLR$ where y=1 to 3; X is Cl, Br, I, H, HO, R'HN, R'$_{2N}$, imidizolo, R'C(O)N(H), R'C(O)N(R''), R'O, $F_3CC(O)N(H)$, $F_3CC(O)N(CH_3)$, or $F_3S(O)_2O$, where R' is a straight or branched chain hydrocarbon of 1 to 4 carbons and R'' is methyl or ethyl; L, a linking group, is $CH_2CH_2$, $CH_2CH_2CH_2$, $CH_2CH_2O$, $CH_2CH_2CH_2O$, $CH_2CH_2C(O)$, $CH_2CH_2CH_2C(O)$, $CH_2CH_2OCH_2$, $CH_2CH_2CH_2OCH_2$; and R, a hydrophobic moiety, is $(CF_2)_nCF_3$ or $(CF(CF_3)OCF_2)_nCF_2CF_3$, where n is 0 to 24. Preferred SAM precursors have y=3 and are commonly referred to as silane coupling agents. Some useful SAM precursors include y=3, X=Cl, L=$CH_2CH_2$, and R=$(CF_2)_nCF_3$; and y=3, X=Cl, L=$CH_2CH_2$ and R=$(CF_2)_5CF_3$.

Where y>1 the SAM precursors can attach to multiple OH groups on the diatomaceous earth surface and can become linked together with the consumption of water, either residual on the surface, formed by condensation with the surface, or added before, during or after the deposition of the SAM precursor. All SAM precursors yield a most thermodynamically stable structure where the hydrophobic moiety, R, of the molecule is extended from the surface to establish normal conformational populations which permit the hydrophobic moiety of the SAM to dominate the air interface. In general, the hydrophobicity of the SAM surface increases with the value of n for the hydrophobic moiety, although in most cases sufficiently high hydrophobic properties are achieved when n is about 4 or greater and the SAM air interface is dominated by the hydrophobic moiety. The precursor can be a single molecule or a mixture of molecules with different values of n for the perfluorinated hydrophobic moiety. When the precursor is a mixture of molecules, it is preferable that the molecular weight distribution is narrow, typically a Poisson distribution or a narrower distribution.

The SAM precursor can have a non-fluorinated hydrophobic moiety as long as it provides a sufficiently low surface energy and readily conforms to the highly partitioned surface of the uncalcined DE. Although the fluorinated SAM precursors indicated above are preferred, in some embodiments of the invention silicones and hydrocarbon equivalents, e.g., $(CH_2)_nCH_3$ or $(CH(CH_3)OCH_2)_nCH_2CH_3$, where n is 0 to 24, of the R groups of the fluorinated SAM precursors above can be used.

The surface functionalization of the diatomaceous earth can be carried out with the neat SAM precursor, or the precursor in a non-reactive solvent such as a hydrocarbon, an ether, or a fluorinated solvent. In some cases, the DE can have the SAM precursor deposited on the DE surface from the vapor phase. The surface functionalization can be carried out with an added non-nucleophilic proton acceptor such as a tertiary amine, for example triethylamine or pyridine, to scavenge acidic byproducts of the reaction. A catalyst can be included to accelerate the formation of the SAM. Water can also be included in the formulation if needed as determined via experimentation by one of ordinary skill in the art. The need for added water will depend upon the amount of residual water on the pretreated diatomaceous earth and the nature of the SAM precursor used. When water is needed it can be introduced as a liquid or a vapor. In many cases, water vapor from ambient air is sufficient to react with the SAM precursor to interconnect the precursors into the structured stable SAM coating. The time and temperature needed for effective formation of the SAM coating will depend upon the structure of the SAM precursor and any solvent, scavenger, or catalyst used. With many of the SAM precursors the treatment can be carried out rapidly at normal room temperatures. Temperatures of about 0 to about 100° C. or more can be used for application of the SAM. Reaction times can vary from as little as about 2 minutes to about 24 hours depending on the SAM precursor and conditions used for the SAM formation. In general, any excess SAM precursor and by-products formed during deposition and bonding can be readily removed from the surface by washing or in some cases by applying a vacuum and/or heat.

Although superhydrophobic diatomaceous earth's (SHDE) surface is, by definition, superhydrophobic, some of the liquid resin can bond to SHDE surface molecular sites due to the incomplete functionalization of SHDE by its silane. Silane covalent bonding requires the presence of silanol sites and a small amount of water to be present during functionalization. This is shown in FIG. 11.

The term "incomplete functionalization" means that not all of silanol sites available on a surface are covalently bonded with a hydrophobic silane molecule, thus leaving some silanol sites naturally hydrophilic. The hydrophobic silanes are not typically bonded to all surface silanes of the nanoporous silica particles. It has been determined that in some instances as little as 4-6% of the surface silanol groups on the diatomaceous earth particles are bonded to hydrophobic silanes and yet provide superhydrophobic properties to the particles. The incomplete 4-6% silane coverage of particle surface is unexpected, since close to 100% coverage would be expected to be necessary to fully functionalize the particle. The incomplete 4-6% coverage to fully functionalize the particle surface occurs because of the repulsive nature of the silane molecules, in that once attached to the particle's surface, it becomes much more difficult for additional silane molecules to approach to the substrate. As the amount of bonded silane molecules reaches 6% coverage, silane repulsion keeps any additional silane molecules from reaching the surface and thus stops additional covalent silane bonding from occurring.

The nanoporous particles can be fumed silica, and hydrophobic silanes are bonded to about 4-6% of the surface silanol groups on the fumed silica particles. The nanoporous particles can be silica aerogel, and hydrophobic silanes are bonded to the surface silanol groups on the silica aerogel particles. The resin can be covalently bonded to the surface of the nanoporous silica particles. The surface area of fumed silica and aerogel is higher than that of diatomaceous earth, and therefore more silane will be required to functionalize these materials. With high quality fluorinated hydrophobic silanes, the maximum silane surface site coverage of the silica was less than 6%. That is, less than 6% of the silica surface molecular sites were bonded with hydrophobic silane molecules and over 94% of the silica molecular sites remained naturally hydrophilic. While the overall effect is still a hydrophobic surface, there are many molecular sites where liquid solvent-based resin can attach and bond to the silica. Thus, it can be expected that solvent-based resins can and will bond somewhat to superhydrophobic silica (like SHDE).

The incomplete coverage of silanol groups on the surface of silicates is known in this art. Typically, about half of the silicate glass molecular sites can be expected to contain hydroxyl groups. These hydroxyl groups are necessary for silane hydrophobic functionalization. The density of hydroxyl groups on silicate glasses is about 2.16 to 2.23 OH $nm^{-2}$. The maximum possible concentration of silanols on silica surfaces has been reported to be between 4.2 and 5.7 OH $nm^{-2}$. This means less than half the possible nanoporous silica particle's silanol sites can be expected to contain hydroxyl groups capable of being functionalized. This is true for all the nanoporous silica particles used herein. But since different types of nanoporous silica particles have different surface areas per gram, the amount of silane necessary to hydrophobic functionalization nanoporous silica particles will depend on the total silica surface area being functionalized. Diatomaceous earth's surface area ranges from 1 $m^2/g$ to 100 $m^2/g$. Aerosil's surface area ranges from 20 $m^2/g$ to 380 $m^2/g$. Aerogel's surface area ranges from 200 $m^2/g$ to 1000 $m^2/g$.

In the case of diatomaceous earth, the presence of surface Si—OH groups are further diluted by many impurities found in this naturally-derived product. The silica content of DE ranges from ~80% to ~96%, depending on the particular species and where it was mined. The specific DE that was used as examples in the present invention had a silica content of ~92%. Therefore, there were at least ~8% impurities which did not have significant Si—OH (silanol) groups. The sites that don't meet the above conditions will remain naturally hydrophilic and resin-philic even after being treated with a hydrophobic silane. Since this invention did not actively condition DE's surfaces to meet these two requirements, there would be DE surface molecular sites that would not be hydrophobically functionalized. Enough silanols are present to produce sufficient site for bonding, but not all sites were hydrophobically functionalized.

Even if it is assumed that these two conditions (hydration and silanol groups) are met for all of the diatomaceous earth surface sites, not all the sites would have been hydrophobically functionalized. The reason has to do with the entropy associated with the very low surface energy of the hydrophobic silanes themselves. These low surface energy silane molecules tend to repel each other. As increasing numbers of hydrophobic silanes covalently bond to the hydrolyzed silica Si—OH sites, it becomes increasingly difficult for subsequent silane molecules to get to and attach to the silica substrate.

The wetting and protecting SHDE surfaces and pores with low surface energy liquids was explored using various solvents like 3M's Fluorinert, Exxon-Mobil's Isopar-C, and Naphtha. (Fluorinert is the trade name for a family of fluorinated solvents including FC-40, FC-43, FC-75, FC-770 etc.).

These protective liquids wet nanotextured and nanoporous hydrophobic silica (like SHDE) and fill and protect a majority of their nanopores from being fully wetted by liquid resin. Unexpectedly, once the superhydrophobic particles are wetted with normally immiscible "protective liquids", they mixed and dispersed well in various paints and liquid resins (including UV curable 3D printer resins). This is very surprising, since normally Fluorinerts are immiscible in paints or liquid resins. But when combined with SHDE, wetted SHDE become mixable in both paints and liquid resins. Note: As the name implies, Fluorinert, by itself is inert, and thus immiscible to virtually all liquids, including all UV curable liquid resins.

The combination of Fluorinert, SHDE, and liquid resin creates a well dispersed mixture with localized concentration of resin and wetted SHDE that can be 3D printed, sprayed, or brushed on to nearly any substrate without significantly affecting the resins overall viscosity or curability. Surprisingly, the result is a cured part with volumetric superhydrophobic behavior. The amount of SHDE wetting "protective liquid" (e.g. FC-40) is adjusted so that the final viscosity of modified UV curable resin is the same as, or similar to, the viscosity of the unmodified liquid resin The effect of mixing such a solution in UV curable liquid resin, results in a resin that can be used for 3D printing of superhydrophobic parts. Even though the solution of SHDE and Fluorinert has the surprising effect of being mixable with liquid resin, it is still somewhat immiscible with the resin, and forms localized concentrated pools of wetted SHDE within the resin. This prevents the resin from free-flowing together into a continuous barrier film during resin curing. This causes the cured resin to have a macro-porosity and micro-porosity (10s to 100s of micron size pores in the resin's surface and volume). Furthermore, since the protective liquid tends to evaporate relatively quickly after curing, a majority of SHDE pores, and most of its nanostructured surface, will be resin and "protective liquid" free and thus superhydrophobic after curing. The resulting 3D printed part is volumetrically superhydrophobic, in that, not only is its surface superhydrophobic, but its entire volume is superhydrophobic. Thus, any portion of the printed part that was printed using this superhydrophobic modification mixture will be superhydrophobic even if its surface is abraded away.

Example 1

15 gms of SHDE (functionalized Celtex 92% SiO2) was wetted and hand mixed with 60 gms of 3M Fluorinert (FC-770). The 75 gms of wetted SHDE was then mixed with 85 gms of "PhotoCentric 3D Firm UV Resin Blue", (which is an SLA UV liquid resin) to form what we called an SH modified UV resin. The 75 gms of wetted SHDE did not substantially change the UV resin's viscosity. This was due to the mixture's relatively large amount of FC-770, which offset the normal increase in viscosity expected by adding SHDE to the resin. Having the SH modified resin's viscosity being the same as the unmodified UV resin allows the 3D printer to extrude the modified resin with the same physical parameters as when printing the unmodified resin. The SH modified liquid resin was then loaded into the reservoir of a Preeflow eco-PEN 3D printer. Next the 3D printer with the SH modified resin printed a 1 in×3 in×⅛ in plate one layer at a time. It printed a total of 7 layers. Curing of each layer occurred by exposing the SH modified resin to a burst of UV radiation after each layer has been printed. This resulted in a part with SLA-Silica chemistry and an average water contact angle of 153° and an average roll off angle of less than 5° as measured with an optical goniometer and an inclined plane.

Example 2

Figure 13:
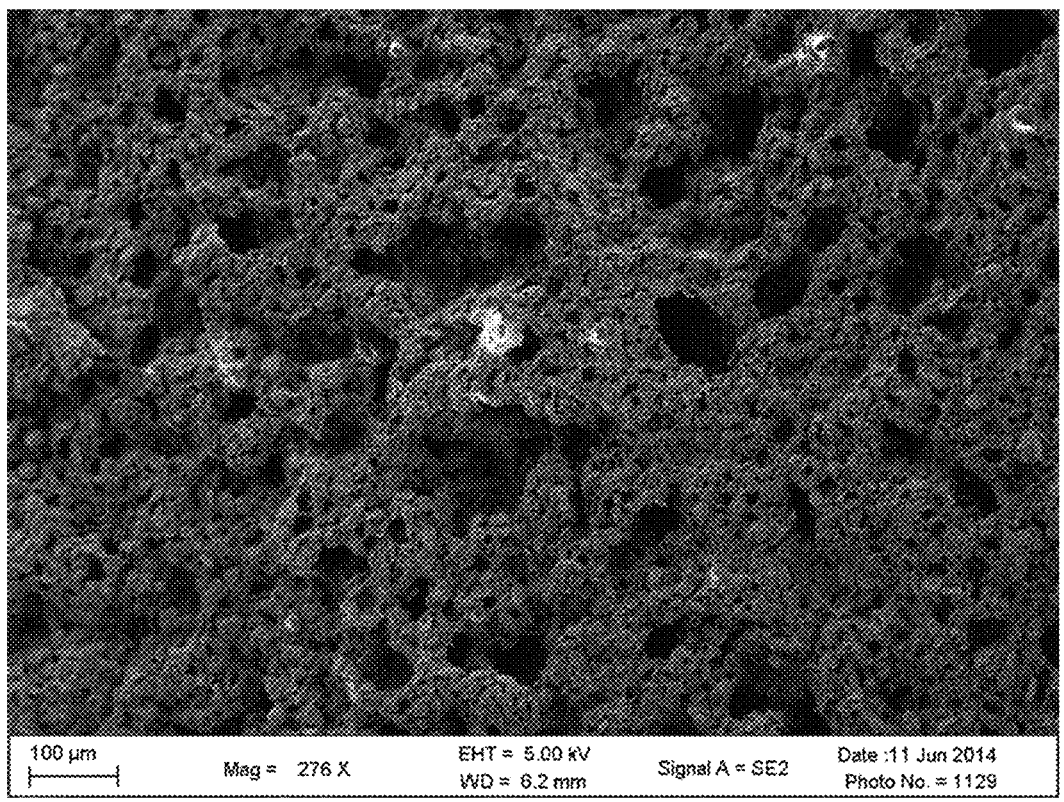
FIG. 13 is an SEM image of a printed surface of bonded SHDE modified resin, at a first magnification.
Figure 14:
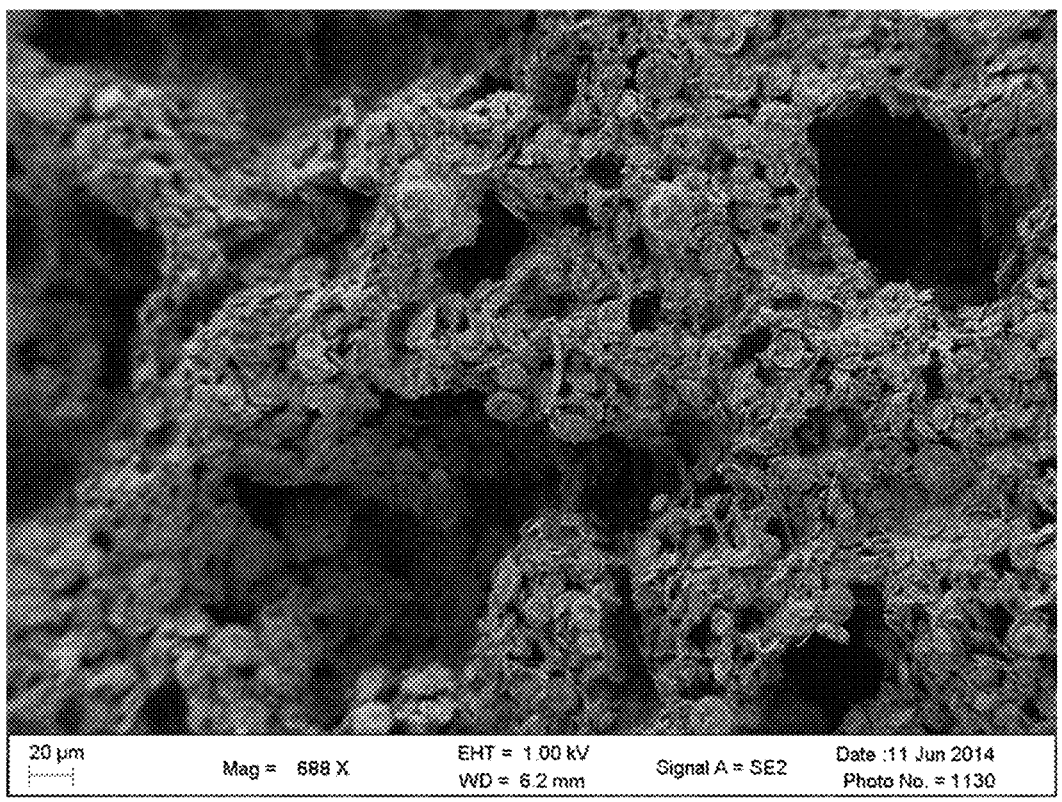
FIG. 14 is an SEM image of a printed surface of bonded SHDE modified resin, at a second magnification.
Figure 15:
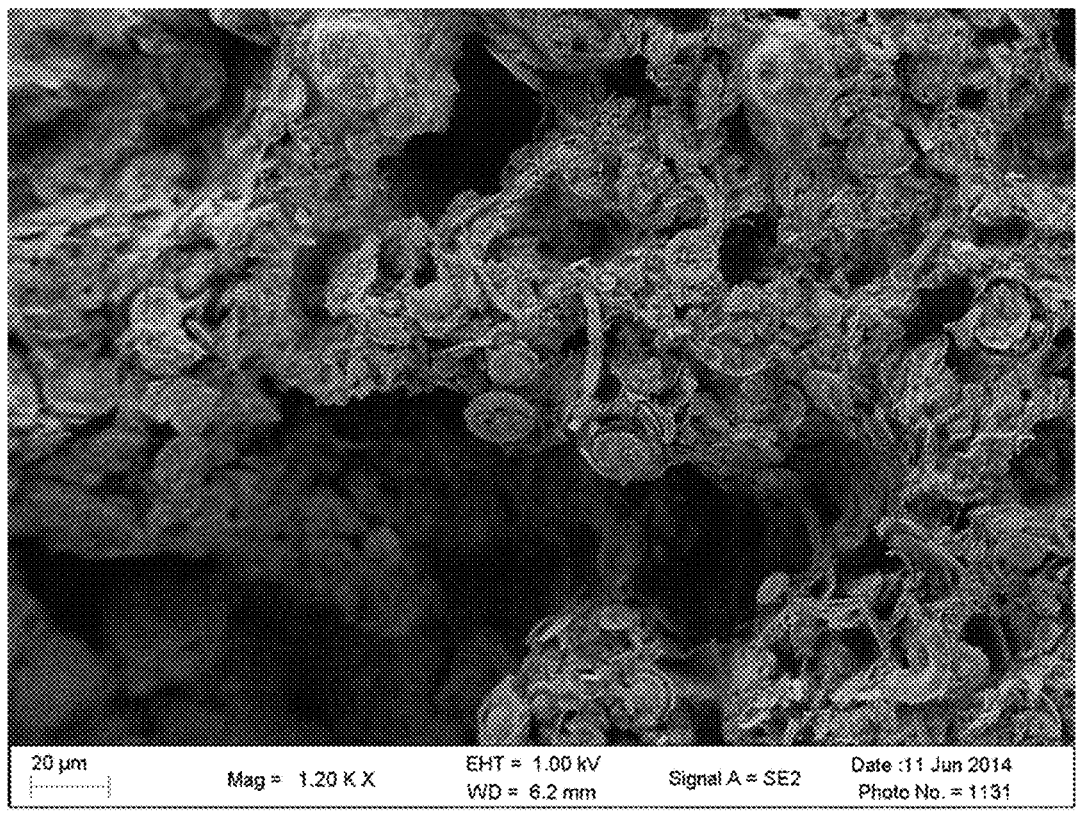
FIG. 15 is an SEM image of a printed surface of bonded SHDE modified resin, at a third magnification.
Figure 16:
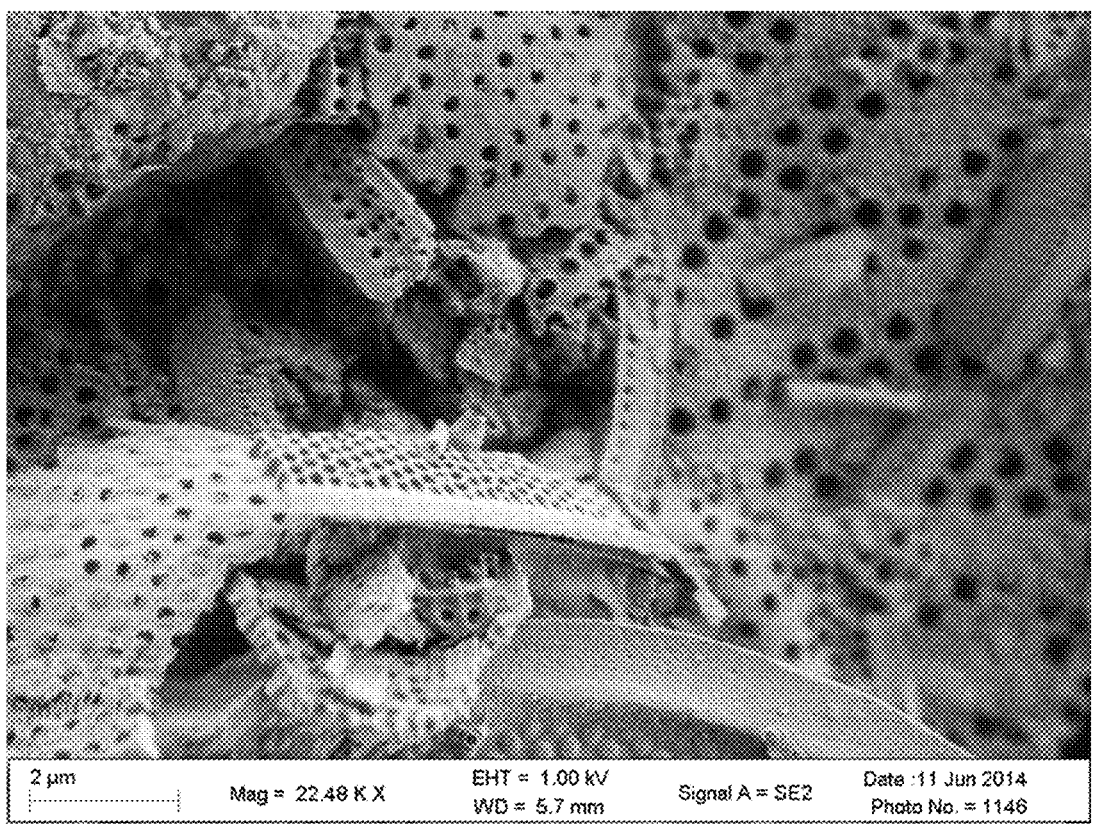
FIG. 16 is an SEM image of SHDE particles after resin curing, showing most of the nanopores unfilled and free of cured resin.

In this example a clear dual-cure polyester casting resin with the brand name Solarez was used. This liquid resin cures in 3 minutes by sunlight or 30 minutes by MEKP catalyst. But for this example, a burst of UV radiation from a mercury vapor lamp was used. 15 gms of superhydrophobic diatomaceous earth (SHDE) was wetted with 80 gms of Fluorinert FC-770 and stirred by hand until thoroughly mixed. This mixture was then added to 85 gms of Solarez liquid casting resin. The solution was hand stirred for 5 minutes. Then a thin film was brushed onto an aluminum plate. The thin film was then exposed to a burst of UV radiation from a mercury lamp source for 30 seconds. This cured (hardened) the resin sufficiently to allow a second layer be brushed onto the first. Once again, the thin film was exposed to a burst of UV radiation from the same mercury lamp for another 30 seconds. This process of brushing on a thin film of resin and curing it with UV radiation was repeated 20 times until the sample thickness reached a depth of ½ an inch. We then placed the sample in sunlight for an hour. The result was a hardened resin sample with a water contact angle of 155° and a water roll off angle of 3°. A medium grit sandpaper was used to abrade the sample surface for 20 seconds. After abrasion the new water contact angle was 149° with a water roll off angle of 5°. FIGS. 13, 14, and 15 are increasingly magnified SEMs of fully cured resins showing SHDE bonded particles covering the resins surfaces and pore walls. FIG. 12 shows superhydrophobic diatomaceous earth (SHDE) particles lining the inner and outer macro pore walls of the cured resin, and having most of their nanopores free of resin. Since the SHDE nanopores are the last areas of evaporation, most of SHDE's nanopores are protected from being fully filled with resin during the bonding and curing process. After curing and "protective liquid" evaporation, less than 50% of the silica particles' outer surface nanopores contain any measurable resin. FIG. 16 is an SEM of SHDE particles bonded to the cured resin showing more than 50% of its outer surface nanopores resin free. The result is a 3D printed superhydrophobic microporous, microporous, and nanoporous part.

This invention can be embodied in other forms without departing from the spirit or essential attributes thereof. Accordingly, reference should be made to the following claims to determine the scope of the invention.

I claim:

1. A method of making a volumetric superhydrophobic portion on a substrate, comprising the steps of:
    mixing nanoporous superhydrophobic particles having a plurality of pores with a protective liquid to provide a protected particle mixture with the protective liquid filling the pores of the particles;
    combining the protected particle mixture with a resin to provide a liquid precursor composition;
    applying the precursor composition to the substrate;
    evaporating the protective liquid from the precursor composition, the evaporating protective liquid forming a plurality of passages through the resin, some of the passages percolating to an outer surface of the resin, and wherein some of the nanoporous superhydrophobic particles are distributed at walls of the passages, some of the nanoporous superhydrophobic particles are embedded within the resin, and some of the nanoporous superhydrophobic particles extend beyond the outer surface of the resin; and,
    curing the resin to solidify the resin and to adhere the resin to the surface and to the particles.

2. The method of claim 1, wherein the evaporating step comprises heating the precursor composition.

3. The method of claim 1, wherein the applying step is 3D printing.

4. The method of claim 1, wherein the nanoporous particle is silica and the silica comprises at least one selected from the group consisting of diatomaceous earth, fumed silica and silica aerogel.

5. The method of claim 1, wherein the surface of the nanoporous silica particles is functionalized.

6. The method of claim 5, wherein the nanoporous particles are functionalized by hydrophobic silanes bonded to surface silanol groups on the nanoporous particles.

7. The method of claim 6, wherein nanoporous particles are diatomaceous earth, and hydrophobic silanes are bonded to 4-6% of the surface silanol groups on the diatomaceous earth particles.

8. The method of claim 6, wherein nanoporous superhydrophobic particles are fumed silica, and hydrophobic silanes are bonded to 4-6% of the surface silanol groups on the fumed silica particles.

9. The method of claim 6, wherein nanoporous particles are silica aerogel, and hydrophobic silanes are bonded to 4-6% of the surface silanol groups on the silica aerogel particles.

10. The method of claim 1, wherein the resin is mechanically bonded to the nanoporous silica particles.

11. The method of claim 1, wherein the resin is covalently bonded to 5-50% of the surface area of the nanoporous silica particles.

12. The method of claim 1, wherein the protective liquid is hydrophilic.

* * * * *